United States Patent
Karlsson et al.

(10) Patent No.: US 11,144,968 B2
(45) Date of Patent: Oct. 12, 2021

(54) SYSTEMS AND METHODS FOR CONTROLLING ONLINE ADVERTISING CAMPAIGNS

(71) Applicant: OATH (AMERICAS) INC., Dulles, VA (US)

(72) Inventors: Niklas Karlsson, Mountain View, CA (US); Jiaxing Guo, Sunnyvale, CA (US)

(73) Assignee: VERIZON MEDIA INC., New York, NY (US)

(*) Notice: Subject to any disclaimer, the term of this patent is extended or adjusted under 35 U.S.C. 154(b) by 993 days.

(21) Appl. No.: 15/190,055

(22) Filed: Jun. 22, 2016

(65) Prior Publication Data

US 2016/0379277 A1    Dec. 29, 2016

Related U.S. Application Data

(60) Provisional application No. 62/183,642, filed on Jun. 23, 2015.

(51) Int. Cl.
*G06Q 30/00* (2012.01)
*G06Q 30/02* (2012.01)

(52) U.S. Cl.
CPC ..... *G06Q 30/0275* (2013.01); *G06Q 30/0246* (2013.01); *G06Q 30/0277* (2013.01)

(58) Field of Classification Search
CPC ............... G06Q 30/02; G06Q 30/0275; G06Q 30/0277; G06Q 30/0246
USPC ................. 705/14.45, 14.48, 14.71
See application file for complete search history.

(56) References Cited

U.S. PATENT DOCUMENTS

| | | | |
|---|---|---|---|
| 2004/0088241 A1* | 5/2004 | Rebane | G06Q 30/08 705/37 |
| 2011/0035276 A1* | 2/2011 | Ghosh | G06Q 30/02 705/14.46 |

* cited by examiner

*Primary Examiner* — Sun M Li
(74) *Attorney, Agent, or Firm* — Cooper Legal Group LLC

(57) ABSTRACT

Embodiments of the present invention provide systems, methods, and computer storage media directed at controlling an advertising campaign. In embodiments, a method includes receiving a desired cost indicator. The desired cost indicator can indicate an average cost per unit a user would like to stay below for a current portion of an advertising campaign. The method can further include monitoring bid transactions of an advertising market associated with the advertising campaign to determine an observed cost measurement from the bid transactions. Based, at least in part, on the desired cost indicator and the observed cost measurement, a price control may be determined that can be utilized to adjust a bid price for the advertising campaign. Other embodiments may be described and/or claimed herein.

20 Claims, 8 Drawing Sheets

SYSTEMS AND METHODS FOR CONTROLLING ONLINE ADVERTISING CAMPAIGNS

CROSS-REFERENCE TO RELATED APPLICATIONS

This application claims priority to provisional U.S. Patent Application No. 61/183,642, filed on Jun. 23, 2015 entitled "Systems and Methods for Controlling Online Advertising Campaigns," the entirety of which is incorporated herein by reference.

TECHNICAL FIELD

The present disclosure relates generally to online advertising. More specifically, and without limitation, the present disclosure relates to systems and methods for controlling bidding in an online advertising campaign.

BACKGROUND

Internet advertisers often create online advertising campaigns that include numerous advertisements (e.g., "banner ads") designed to be placed on websites during a specified period of time. For example, a company may design several advertisements for a product or service offered by the company. The company may wish to have the advertisements placed on websites to promote the product or service. Each time one of these advertisements is placed on a website is known as an "impression." When a user views the advertisement, the user may select, or "click," on the advertisement or may take another "action" such as completing an online form to request additional information with regard to the product or service. If the user later purchases the product or services, the purchase is referred to as a "conversion" of the impression.

Advertisers may be interested in impressions (e.g., when trying to increase awareness of a product or service), clicks (e.g., when trying to provide more information about a product or service), or conversions (e.g., when trying to make sales of a product or service). Advertisers may pay based on, for example, impressions, clicks, or conversions over the course of an advertising campaign, hereinafter merely referred to as a "campaign." An advertiser may have a spending plan that specifies how the advertiser wishes to spend a budget that has been allocated for the campaign. For instance, the advertiser may wish to spend money only on certain days, or certain times of day, during the campaign, or may wish to spend evenly over the duration of the campaign. Each advertiser may have a daily budget (e.g., $1,000 per day) and/or a daily goal of impression volume (e.g., 1000 impressions per day), known as "maximum daily delivery" or "daily pacing." Each advertiser may also desire an ad campaign to perform certain types of consumer targeting (e.g., based on a demographic analysis) and/or achieve a particular distribution of advertisements across various websites ("spreading").

As a result, various techniques are used to manage online ad delivery within and among advertising campaigns. In certain advertising networks, ad servers receive impression requests from publishers (e.g., websites or other entities with an inventory of online ad space). The ad servers may group ad requests from various advertising campaigns, e.g., according to impressions to be "targeted" based on a combination of attributes defined by the ad requests. In addition to targeting attributes, each ad request received from an advertiser generally includes a "bid price" and sometimes a "bid allocation." The bid price is the amount of money offered by the ad request for placement of the targeted impression. The bid allocation, if present, is the percentage or ratio (e.g., point value from 0 to 1) of targeted inventory the ad campaign is willing to purchase at the bid price. The list of ads that target a certain impression request may be sorted in descending order according to their bid price, and then placed in groups such that the sum of their bid allocations equals 1. If the ad request with the highest bid price has a bid allocation of 1, or if there is no restriction on bid allocation, it will win the impression. Such ad delivery methods ensure that the highest bidding advertiser is able to purchase as much inventory as desired. These methods also reveal both the marginal value of the impression inventory (e.g., the cost required per impression), and the amount of volume (e.g., the number of impressions) purchased at each price.

The competitive bidding in an online advertising marketplace may be problematic, however, from the perspective of the advertiser. Conventional online advertising campaigns control delivery in a way that balances advertisers' return on investment with publishers' revenue. As a result, they do not seek to deliver the impressions at minimum cost to the advertiser. Put another way, conventional online advertising campaigns do not seek to optimize performance (e.g., cost per event) in favor of the advertiser.

SUMMARY

In accordance with various embodiments of the present disclosure, a computer-implemented method is provided for controlling advertising campaigns. The method includes receiving a desired cost indicator that indicates an average cost per event a user would like to stay below for a current portion of an advertising campaign. The method further includes monitoring bid transactions of an advertising market associated with the advertising campaign to determine an observed cost measurement from the bid transactions. The method further includes determining a price control based at least in part on the desired cost indicator and the observed cost measurement to adjust a bid price for the advertising campaign.

In accordance with other various embodiments of the present disclosure, one or more computer-readable media are provided for storing instructions. The instructions, when executed by a computing device, cause the computing device to receive a desired cost indicator that indicates an average cost per event a user would like to stay below for a current portion of an advertising campaign; and receive a desired pacing indicator that indicates a desired pacing that the user would like to achieve for the current portion of the advertising campaign. The instructions further cause the computing device to monitor bid transactions of an advertising market associated with the advertising campaign to determine an observed cost measurement and an observed pacing measurement from the bid transactions. The instructions then cause the computing device to determine a price control based, at least in part, on the desired cost indicator, the observed cost measurement, the desired pacing indicator and the observed pacing measurement to adjust a bid price for the advertising campaign.

In accordance with various system embodiments of the present disclosure, a system is provided for controlling advertising campaigns. The system includes a cost error calculator configured to receive a desired cost signal that indicates an average cost per event a user would like to stay below for a current portion of an advertising campaign and an observed cost signal based on observed transactions of the advertising campaign. The cost error calculator is further configured to generate a cost error signal based on the desired cost indicator and the observed cost measurement. The system further includes a pacing error calculator configured to receive a desired pacing signal that indicates a desired pacing that the user would like to achieve for the current portion of the advertising campaign and an observed pacing signal based on observed transactions of the advertising campaign. The pacing error calculator is further configured to generate a pacing error signal based on the desired pacing signal and the observed pacing signal. The system further includes a controller configured to generate a price control signal based at least in part on the cost error signal and the pacing error signal to be utilized to adjust a bid price for the advertising campaign.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

DETAILED DESCRIPTION OF THE EMBODIMENTS

Reference will now be made in detail to illustrative embodiments of the invention, examples of which are illustrated in the accompanying drawings. Wherever possible, the same reference numbers will be used throughout the drawings to refer to the same or like parts.

As mentioned previously, the competitive bidding marketplace in an online advertising campaign may be problematic from the perspective of the advertiser. Conventional online advertising campaigns control delivery in a way that balances advertisers' return on investment with publishers' revenue. As a result, they do not seek to deliver the impressions at minimum cost to the advertiser. Put another way, conventional online advertising campaigns do not seek to optimize performance in favor of the advertiser. The present invention is directed at a campaign control system that facilitates obtaining a desired pacing while considering cost to the advertiser.

Figure 1:
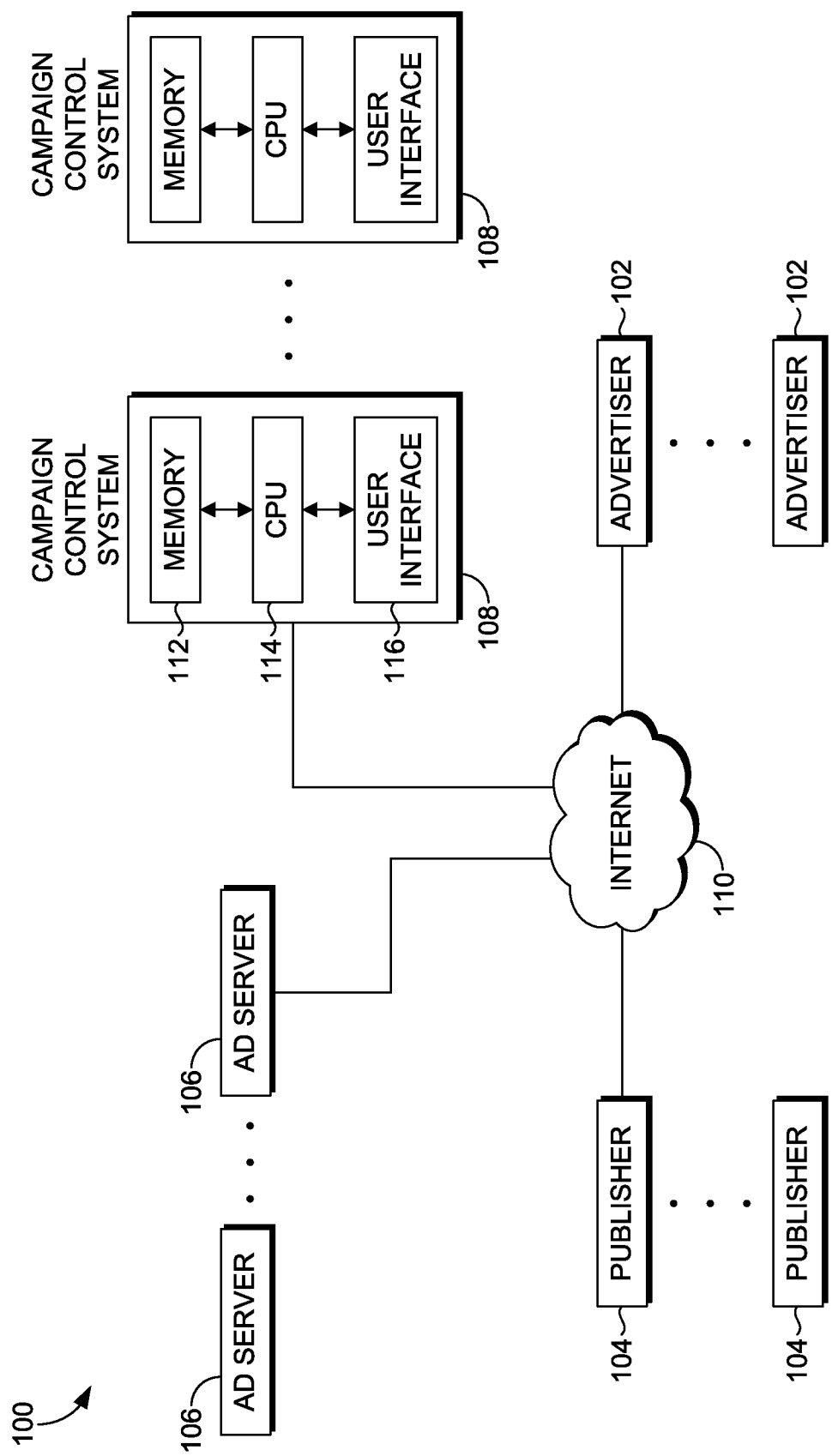
FIG. 1 depicts an illustrative advertising system, in accordance with embodiments of the present disclosure.

FIG. 1 depicts an illustrative advertising system 100, in accordance with embodiments of the present disclosure. As shown in FIG. 1, advertising system 100 may include one or more advertisers 102, publishers 104, ad servers 106, and campaign control systems 108, that are in communication with one another through a network, such as the Internet 110. The number and orientation of the computing components in FIG. 1 is provided for purposes of illustration only. Any other number and orientation of components is possible. For example, one or more of advertisers 102, publishers 104, ad servers 106, and campaign control systems 108 may be combined or co-located and/or communicate directly with one another, instead of over Internet 110. The components of FIG. 1 may include any type or configuration of computers and/or servers, such as, for example, a server cluster, a server farm, load balancing servers, distributed servers, etc. In addition, each component may include one or more processors, memories or other data storage devices (i.e., computer-readable storage media), such as hard drives, NOR or NAND flash memory devices, or Read Only Memory (ROM) devices, etc., communications devices, and/or other types of computing elements.

Advertisers 102 represent computing components associated with entities having online advertisements (e.g., banner ads, pop-ups, etc.) that the entities desire to deliver to online consumers. Advertisers 102 may interact with publishers 104, ad servers 106, and/or campaign control systems 108 through the Internet 110. Thus, advertisers 102 may be able to communicate advertising information, such as ad information, targeting information, consumer information, budget information, bidding information, etc., to other entities in system 100.

Publishers 104 represent computing components associated with entities having inventories of available online advertising space. For example, publishers 104 may include computing components associated with online content providers, search engines, e-mail programs, web-based applications, or any computing component or program having online user traffic. Publishers 104 may interact with advertisers 102, ad servers 106, and/or controllers 108 via the Internet 110. Thus, publishers 104 may be able to communicate inventory information, such as site information, demographic information, cost information, etc., to other computing components in system 100.

Ad servers 106 may include servers or clusters of servers configured to process advertising information from advertisers 102 and/or inventory information from publishers 104, either directly or indirectly. In certain embodiments, ad servers 106 may be remote web servers that receive advertising information from advertisers 102 and serve ads to be placed by publishers 104. Ad servers 106 may be configured to serve ads across various domains of publishers 104, for example, based on advertising information provided by advertisers 102. Ad servers 106 may also be configured to serve ads based on contextual targeting of web sites, search results, and/or user profile information. In some embodiments, ad servers 106 may be configured to serve ads based on control signals generated by campaign control systems 108.

Campaign control systems 108 may include computing systems configured to receive information from computing components in system 100, process the information, and generate advertising control signals to be sent to other computing components in system 100, according to the illustrative methods described herein. Campaign control systems 108 may include any type or combination of computing systems, such as clustered computing machines and/or servers, including virtual computing machines and/or virtual servers. Campaign control systems 108 may include, for example, implementations of Adlearn Open Platforms (AOP) control systems offered by America Online (AOL) of New York, N.Y. In some embodiments, campaign control systems 108 may include an assembly of hardware, including a memory 112, a central processing unit ("CPU"), and/or a user interface 116. Memory 112 may include any type of RAM or ROM embodied in a physical, computer-readable storage medium, such as magnetic storage including floppy disk, hard disk, or magnetic tape; semiconductor storage such as solid state disk (SSD) or flash memory; optical disc storage; or magneto-optical disc storage. CPU 114 may include one or more processors for processing data according to instructions stored in the memory, for example to perform the methods and processes discussed in detail herein. The functions of the processor may be provided by a single dedicated processor or by a plurality of processors. Moreover, the processor may include, without limitation, digital signal processor (DSP) hardware, or any other hardware capable of executing software. User interface 116 may include any type or combination of input/output devices, such as a display monitor, graphical user interface, touchscreen or pad, keyboard, and/or mouse. In other embodiments, campaign control systems 108 may include virtual representations of hardware operating, for example, on a virtualization server.

Figure 2:
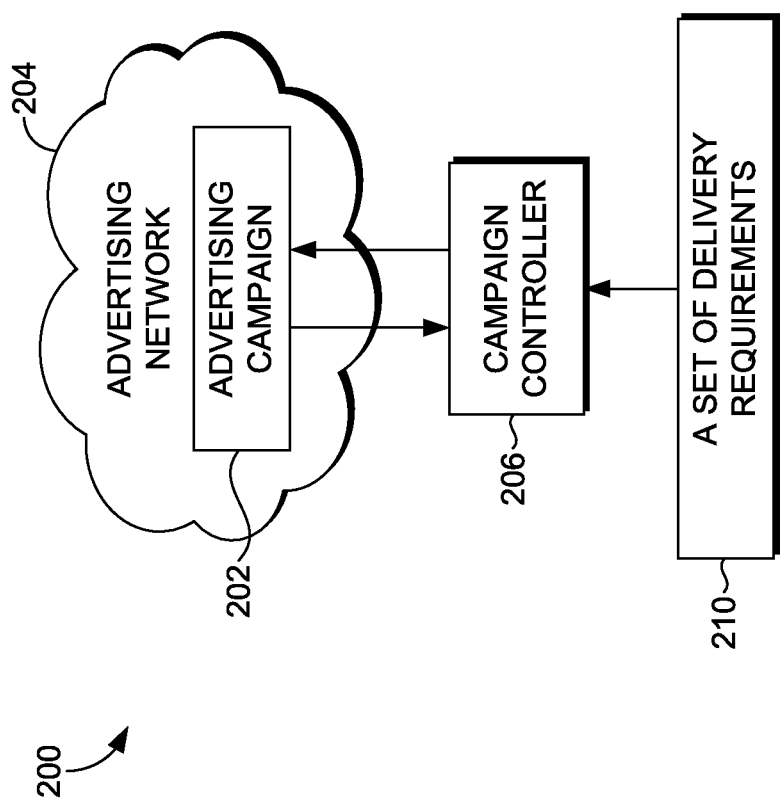
FIG. 2 depicts an illustrative online advertising control system for controlling an online advertising campaign operating in an online advertising network, in accordance with various embodiments of the present disclosure.

FIG. 2 depicts an illustrative online advertising control system 200 for controlling an online advertising campaign 202 operating in an online advertising network 204. Advertising network 204 may include a network or collection of one or more advertisers 102, one or more publishers 104, ad severs 106, campaign control systems 108, or other components of system 100. Elements of advertising network 204 may operate to receive impression requests associated with one or more ad inventories, e.g., from publishers 104 such as websites or other computing components with an inventory of online ad space. Advertising network 204 may also group impression requests for various advertising campaigns, e.g., according to impressions to be "targeted" based on a combination of attributes defined by the ad requests. Advertising network 204 may also accept bids (e.g., from one or more campaign control systems 108) on the impression requests and process the bids to serve ads to the impression requests.

Any number or type of advertising campaigns 202 may be operated within advertising network 204, across various ad servers and domains associated with the Internet. Control system 200 may be implemented by one or more of the advertisers 102, publishers 104, ad servers 106, and/or controllers 108 described in FIG. 1. For example, control system 200 may represent the interaction of one or more of controllers 108 with other computing components in system 100.

Figure 6:
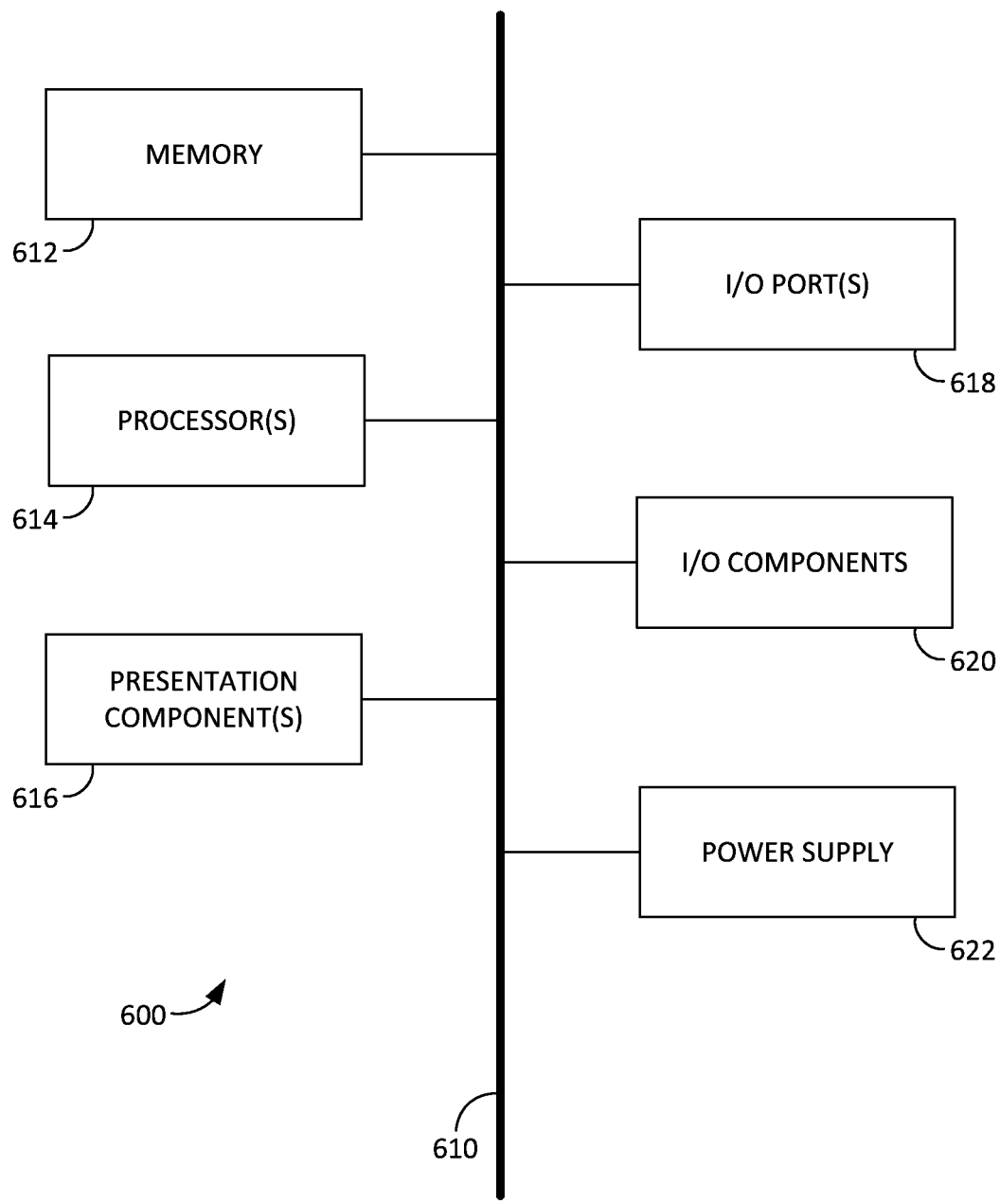
FIG. 6 is a block diagram of an example computing device in which various embodiments of the present disclosure may be employed.

In one embodiment, control system 200 may include, among other control modules, one or more instances of campaign controller 206. Campaign controller 206 may comprise computers or servers connected to the Internet. Such computers or servers may be configured as described with respect to campaign control system 108, as depicted by FIG. 6, or in any other suitable configuration. Alternatively, campaign controller 206 may be implemented by software modules executed by CPUs 114 of controllers 108. Campaign controller 206 may be embodied entirely in hardware, entirely in software, or in any combination of hardware and software.

Campaign controller 206 may be provided with a set of delivery requirements 210, which may be adjustable design parameters set by a user. For instance, the set of delivery requirements may include cost requirements (e.g., the maximum cost discussed in reference FIG. 3 or 4), pacing requirements (e.g., daily budget goals, daily impression delivery goals), targeting requirements (e.g., based on a demographic analysis), and/or spread requirements (e.g. to control advertising across inventory units/cells, and/or user targets, etc.). The set of delivery requirements 210 may be implemented by one or more controllers of system 200, including campaign controller 206.

In one embodiment, campaign controller 206 may be a controller configured to assist an advertising campaign 202 in meeting pacing goals at minimum cost to the advertiser. In accordance with the disclosed embodiments, campaign controller 206 may be configured to control bid price, and optionally allocation signals, to optimize the revenue spending of the ad campaign in accordance with an objective set by a user. Such objectives may include, for example, a smoothness objective in which campaign controller 206 manages campaign delivery to achieve smoothness in revenue spending over the course of the campaign. In one embodiment, campaign controller 206 may implement at least some of the illustrative systems and methods described in U.S. patent application Ser. No. 13/416,796, filed on Mar. 9, 2012, the entire disclosure of which is incorporated herein by reference.

Figure 3A:
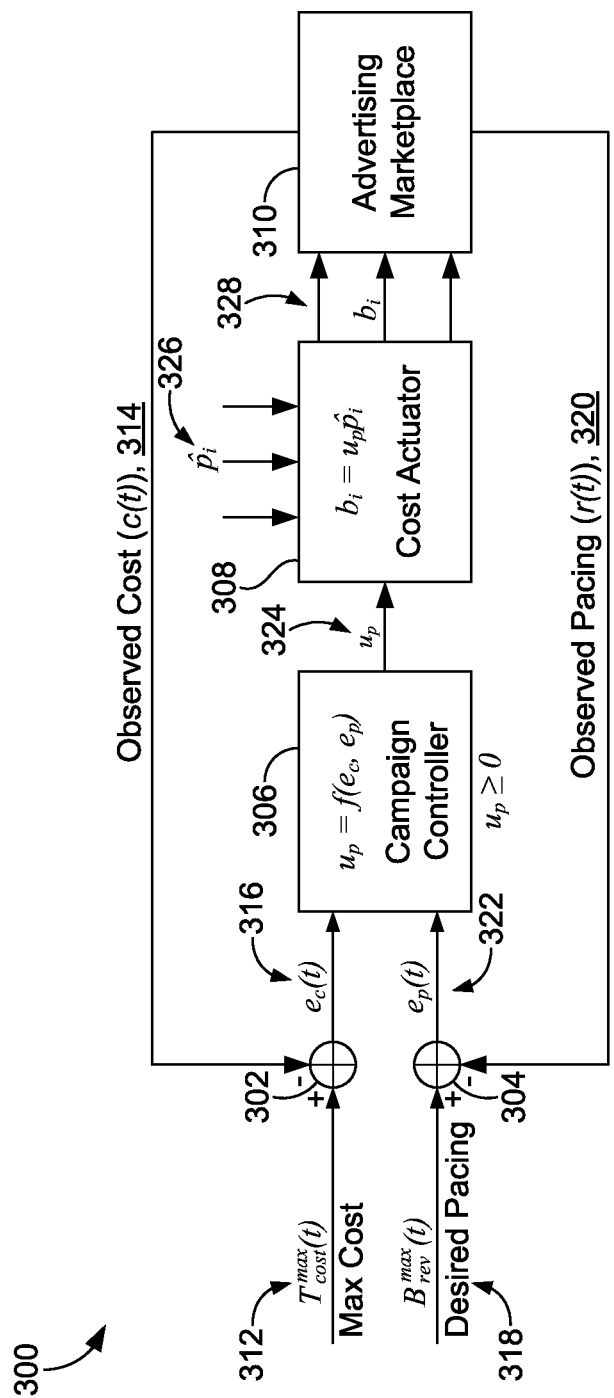
FIGS. 3A and B depict block diagrams of illustrative campaign control systems for controlling online advertising campaigns, in accordance with various embodiments of the present disclosure.

FIG. 3A depicts a block diagram of a portion of an illustrative campaign control system 300 for controlling online advertising campaigns, in accordance with various embodiments of the present disclosure. Campaign control system 300 may generally be configured to utilize data previously observed in advertising marketplace 310. This data can be utilized to control subsequent bids placed in advertising marketplace 310 to facilitate obtaining the desired pacing at minimum cost to the advertiser. As depicted, campaign control system 300 includes five components: a cost error calculator 302, a pacing error calculator 304, a campaign controller 306 (e.g., campaign controller 206 of FIG. 2), a cost actuator 308, and an advertising marketplace 310. Each of these components may be communicatively coupled with one another, for example as depicted in FIG. 3A. This communicative coupling may be, for example, via a bus, network, shared memory, etc.

Cost error calculator is generally configured to generate a cost error signal. A cost error signal may be utilized, as described herein, to adjust a bid price for an advertising campaign. As depicted, cost error calculator 302 is configured to take as input a max cost reference signal ($T_{cost}^{max}(t)$) 312, where 't' indicates time, hereinafter merely referred to as max cost 312. Max cost 312 may be a user (e.g., advertiser) defined maximum cost that the user is willing to pay for an event. As used herein, event refers to any action taken with an advertisement (e.g., impression, click, or conversion). In embodiments, max cost 312 may represent the maximum average cost the user is willing to pay for each event, the maximum discrete cost the user is willing to pay for each event, or any other suitable cost restriction.

In addition to max cost 312, cost error calculator 302 is also configured to take as input observed cost 314. Observed cost 314 can be determined from actual cost data for transactions that are observed in advertising marketplace 310. The observed cost 314 may be, for example, a moving average calculated over a period of time. This period of time can be any duration of time that may be based upon certain campaign characteristics. For example, a shorter period of time can enable quicker reflection of changes in the advertising marketplace, however the results could be noisier than those of a moving average calculated over a longer period of time. A moving average calculated over a longer period of time, on the other hand, can be less noisy than a moving average calculated over a shorter period of time, but is slow to react to market changes. As a result, the time period for such a moving average may be dependent on the campaign and/or volatility of advertising marketplace 310. A moving average may be calculated by a moving average filter. In some embodiments, such a moving average filter could be included within the cost error calculator 302. In such embodiments, observed cost 314 may represent cost data concerning discrete transactions that are observed within advertising marketplace and processed by the moving average filter. In other embodiments, such a moving average filter may be in-line between advertising marketplace 310 and cost error calculator 302. Discrete observed costs in advertising marketplace 310 may be monitored, for example, via a cost sensor configured to obtain real-time data from advertising marketplace 310. In embodiments, this real time data may be specific to the campaign to which campaign control system 300 is assigned.

Cost error calculator 302 may be configured to utilize the above discussed max cost 312 and observed cost 314 to calculate a cost error signal, $e_c(t)$, 316, where 't' represents a point in time at which the cost error signal is calculated. In some embodiments, cost error signal 316 is calculated by taking the difference between max cost 312 and observed cost 314. In such embodiments, $e_c(t)$ can be considered as a measurement of how far from max cost 312 the campaign is at time t. If $e_c(t)<0$, then the observed cost is higher than max cost 312 and may need to be reduced moving forward by the controller via a reduction of $u_p$. If on the other hand $e_c(t)>0$, then there is room to increase the cost as necessary in an effort to deliver the desired pacing.

Pacing error calculator is generally configured to generate a pacing error signal. A pacing error signal may also be utilized, as described herein, to adjust a bid price for an advertising campaign. As depicted, pacing error calculator 304 is configured to take as input a desired pacing reference signal 318, $B_{rev}^{max}(t)$, where 't' again represents time, hereinafter merely referred to as desired pacing 318. Desired pacing 318 may be user defined and may also be referred to as a maximum desired revenue or a maximum budget. As used herein, revenue may refer to actual dollars spent or actual events delivered. As such, desired pacing may be expressed as monetary units (e.g., dollars) or as a number of events. For example, if an advertising campaign has a daily budget of $1000 and has spent $800 in a given day, revenue for the campaign on that given day is $800.

In addition to desired pacing 318, pacing error calculator 304 is also configured to take as input observed pacing 320. Observed pacing 320 can be determined from actual pacing observed in advertising marketplace 310. As with observed cost 314, observed pacing 320 may be a moving average calculated over a period of time. This period of time can be any duration of time that may be selected based upon certain campaign characteristics. For example, a shorter period of time can enable quicker reflection of changes in advertising marketplace 310, however the results could be noisier than those of a moving average calculated over a longer period of time. A moving average calculated over a longer period of time, on the other hand, can be less noisy than a moving average calculated over a shorter period of time, but is slow to react to changes in advertising marketplace 310. As a result, the time period for such a moving average may be dependent on the campaign and/or volatility of advertising marketplace 310. The above discussed moving average may be calculated by a moving average filter included within the pacing error calculator 304 or a moving average filter that is in-line between advertising marketplace 310 and pacing error calculator 304. Discrete observed pacing in advertising marketplace 310 may be monitored, for example, via a pacing sensor configured to obtain real-time data about the campaign to which campaign control system 300 is assigned.

Pacing error calculator 304 may be configured to utilize the above discussed desired pacing 318 and observed pacing 320 to calculate a pacing error signal, $e_p(t)$, 322, where t represents a point in time at which the pacing error signal is calculated. In some embodiments, pacing error signal 322 is calculated by taking the difference between desired pacing 318 and observed pacing 320. In such embodiments, $e_p(t)$ can be considered as a measurement of how far from desired pacing 318 the campaign is at time t. If $e_p(t)<0$, then the observed pacing 320 is higher than desired pacing 318 and can be reduced moving forward by the controller by via a reduction of $u_p$. If on the other hand $e_p(t)>0$, then observed pacing is less than desired pacing and may need to be increased provided there is room to increase the cost.

The cost error signal 316 and pacing error signal 322 may be output to campaign controller 306 by cost error calculator 302 and pacing error calculator 304, respectively.

Campaign controller 306 may be configured to take the cost error signal 316 and the pacing error signal 322 as input, which may also be considered error feedback signals. Campaign controller 306 may be configured to determine a price control signal, $u_p$ 324. The price control signal, $u_p$ 324, may be calculated based, at least in part, on the cost error signal 316 and the pacing error signal 322. In embodiments, the price control signal, $u_p$ 324, is a result of a function of the cost error signal 316 and the pacing error signal 322, $f(e_c, e_p)$. This function may be configured to attempt to facilitate obtaining the desired pacing 318 at minimum cost to the advertiser within the limits of max cost 312 and/or inventory available in advertising marketplace 310. As such, $u_p$ 324, in some embodiments, can be updated in such a way that (1) observed pacing 320 approximately converges to a closest pacing to the desired pacing 318 while observed cost 314 remains at or below max cost 312, where an increase in observed cost 314 would no longer yield a change in observed pacing 320 without exceeding desired pacing 318 (e.g., the desired pacing is bounding), such a scenario is depicted in scenario 534 of FIG. 5B; or (2) observed cost 314 approximately converges to a closest cost to the max cost 312 while observed pacing 320 remains at or below desired pacing 318, where an increase in observed cost 314 would no longer yield a change in observed pacing 320 without exceeding max cost 312 (e.g., max cost is bounding), such a scenario is depicted in scenario 540 of FIG. 5B; or (3) observed pacing 320 approximately converges to a maximum possible delivery in the advertising marketplace while the observed cost 314 remains at or below max cost 312, and without $u_p$ staying bounded, where an increase in observed cost 314 can no longer yield a change in observed pacing 320 because the inventory of the marketplace has been exhausted (e.g., inventory in the advertising marketplace is bounding), such a scenario is depicted in scenario 546 of FIG. 5B.

In some embodiments, a bid allocation, $u_a$, not depicted, may also be calculated by campaign controller 306. Such a bid allocation represents the percentage or ratio (e.g., point value from 0 to 1) of inventory the ad campaign is willing to purchase at the bid price discussed below.

In some embodiments, campaign controller 306 may be configured to periodically update the price control signal, $u_p$ 324, as well as an allocation control signal, $u_a$, if utilized. These periodic updates may take place at predefined time intervals (e.g., every 15 minutes), based on a specific occurrence (e.g., based on a magnitude of change to an error signal), or any other suitable period. In other embodiments, campaign controller 306 may update the price control signal, $u_p$ 324, in real time as the above discussed error signals, or reference signals, change.

To facilitate obtaining the desired pacing 318 at minimum cost to the advertiser, the above described function, $f(e_c, e_p)$, may utilize an adaptive control scheme in calculating the price control signal, $u_p$ 324. Such an adaptive control scheme could calculate the $u_p$ 324, and an optional allocation signal, $u_a$, not depicted, based on a most recent value of the cost error signal 316, a most recent value of the pacing error signal 322, and a stored controller state variable, which includes information about the past control performance. The adaptive control scheme is known in the art and a person of ordinary skill in the art would be able to implement such a control scheme. In other embodiments, alternative control schemes may be utilized in place of the adaptive control scheme. Such control schemes are known in the art and would include an optimal control scheme, a model predictive control scheme, a proportional-integral-derivative (PID) control scheme, a robust control scheme, a stochastic control scheme, or any other suitable control scheme.

Cost actuator 308 takes the price control signal, $u_p$ 324, as input. In addition, cost actuator 308 can take one or more cell-level performance predictions, $\hat{p}_i$ 326, as input. The 'i' refers to the cell to which the cell-level performance prediction belongs. As used herein a cell refers to a defined portion of advertising marketplace 310. Such a cell may be, for example, a website, a group of individuals identified by demographic analysis (e.g., males between the age of 25 and 35 in California), a distinct individual, etc. The performance prediction of a cell represents the likelihood of that an impression delivered to that cell will result in either a click-through or a conversion.

Cost actuator may utilize the combination of the price control signal, $u_p$ 324, and the cell-level performance predictions, $\hat{p}_i$ 326, to calculate a bid price, $b_i$ 328, for the respective cell. In some embodiments, the bid price, $b_i$ 328, is calculated by taking the product of $u_p$ 324 and $\hat{p}_i$ 326, for each $\hat{p}_i$. These bids are depicted by the individual arrows flowing from cost actuator 308 to advertising marketplace 310. In other embodiments, the bid price may be a capped cell-level bid price calculated, for example, using the equation $b_i = \min(\text{maxCPI}, u_p \hat{p}_i)$, where maxCPI is max cost per impression, or, as another example, equation $b_i = \min(\text{maxCPI}_i, u_p \hat{p}_i)$, where maxCPI$_i$ is max cost per impression for cell i. It will be appreciated by someone of ordinary skill in the art that these examples are merely meant to illustrative and are not intended to limit the scope of this disclosure. For example, Min can be replaced by max and/or the min (max) operation may be conditional based on user, ad, or impression specific information. In addition, the capping may apply only for a certain type of user, a certain time of the day, in a certain geographic region, etc.

Advertising marketplace 310 represents a bidding environment in which advertisers place ad requests for advertising space that is offered by publishers. The above discussed components facilitate an advertiser in obtaining the desired pacing 318 at minimum cost (e.g., minimum bid) to the advertiser within the limits of max cost 312 and/or inventory available in advertising marketplace 310.

Figure 3B:
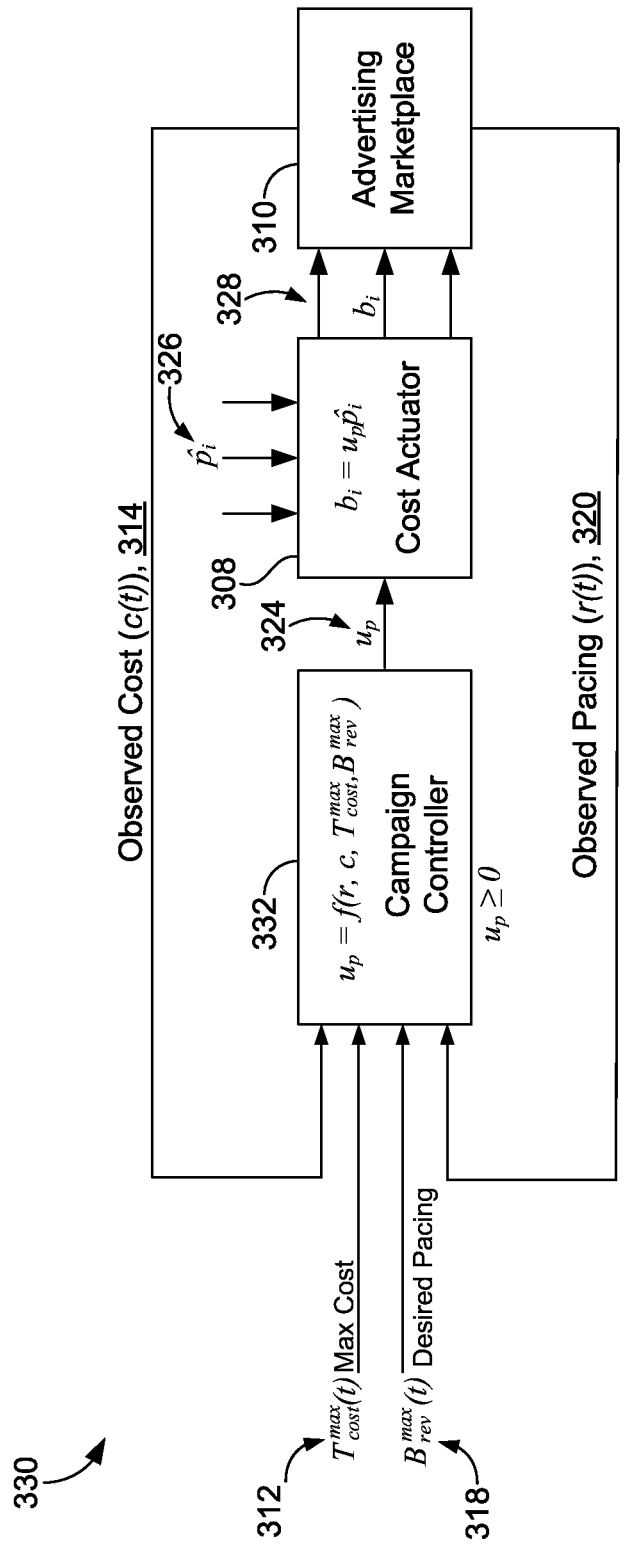

FIG. 3B depicts another block diagram of a portion of an illustrative campaign control system 330 for controlling online advertising campaigns, in accordance with various embodiments of the present disclosure. Components having the same number are configured in a like manner to that described above in reference to FIG. 3A. As depicted, cost error calculator 302 and pacing error calculator 304 are omitted from this embodiment. Instead, as depicted, campaign controller 332 in may be configured to take the max cost 312, observed cost 314, desired pacing 318, and observed pacing 320 as input. Max cost 312 and desired pacing 318 may be referred to herein as reference signals, while observed cost 314 and observed pacing may be referred to herein as feedback signals.

Campaign controller 332 may be configured to determine a price control signal, $u_p$ 324. The price control signal, $u_p$ 324, may be calculated based, at least in part, on the max cost 312, observed cost 314, desired pacing 318, and observed pacing 320. In embodiments, the price control signal, $u_p$ 324, is a result of a function of the max cost 312, observed cost 314, desired pacing 318, and observed pacing 320, $f(r, c, T_{cost}^{max}, B_{rev}^{max})$. This function may be configured to attempt to facilitate obtaining the desired pacing 318 at minimum cost to the advertiser within the limits of max cost 312 and/or inventory available in advertising marketplace 310. As such, $u_p$ 324, in some embodiments, can be updated in such a way that (1) observed pacing 320 approximately converges to a closest pacing to the desired pacing 318 while observed cost 314 remains at or below max cost 312, where an increase in observed cost 314 would no longer yield a change in observed pacing 320 without exceeding desired pacing 318 (e.g., the desired pacing is bounding), such a scenario is depicted in scenario 534 of FIG. 5B; or (2) observed cost 314 approximately converges to a closest cost to the max cost 312 while observed pacing 320 remains at or below desired pacing 318, where an increase in observed cost 314 would no longer yield a change in observed pacing 320 without exceeding max cost 312 (e.g., max cost is bounding), such a scenario is depicted in scenario 540 of FIG. 5B; or (3) observed pacing 320 approximately converges to a maximum possible delivery in the advertising marketplace while observed cost 314 remains at or below max cost 312, and without $u_p$ staying bounded, where an increase in observed cost 314 can no longer yield a change in observed pacing 320 because the inventory of the marketplace has been exhausted (e.g., inventory in the advertising marketplace is bounding), such a scenario is depicted in scenario 546 of FIG. 5B.

In some embodiments, a bid allocation, $u_a$, not depicted, may also be calculated by campaign controller 332. Such a bid allocation represents the percentage or ratio (e.g., point value from 0 to 1) of inventory the ad campaign is willing to purchase at the bid price discussed below.

In some embodiments, campaign controller 332 may be configured to periodically update the price control signal, $u_p$ 324, as well as an allocation control signal, $u_a$, if utilized. These periodic updates may take place at predefined time intervals (e.g., every 15 minutes), based on a specific occurrence (e.g., based on a change to desired pacing), or any other suitable period. In other embodiments, campaign controller 332 may update the price control signal, $u_p$ 324, in real time as the above discussed feedback signals, or reference signals, change.

To facilitate obtaining the desired pacing 318 at minimum cost to the advertiser, the above described function, $f(r, c, T_{cost}^{max}, B_{rev}^{max})$, may utilize an adaptive control scheme in calculating the price control signal, $u_p$ 324. Such an adaptive control scheme could calculate the $u_p$ 324, and an optional allocation signal, $u_a$, not depicted, based on a most recent values of the reference signals and/or feedback signals, in conjunction with a stored controller state variable, which includes information about the past control performance. The adaptive control scheme is known in the art and a person of ordinary skill in the art would be able to implement such a control scheme. In other embodiments, alternative control schemes may be utilized in place of the adaptive control scheme. Such control schemes are known in the art and would include an optimal control scheme, a model predictive control scheme, a proportional-integral-derivative (PID) control scheme, a robust control scheme, a stochastic control scheme, or any other suitable control scheme.

Figure 4:
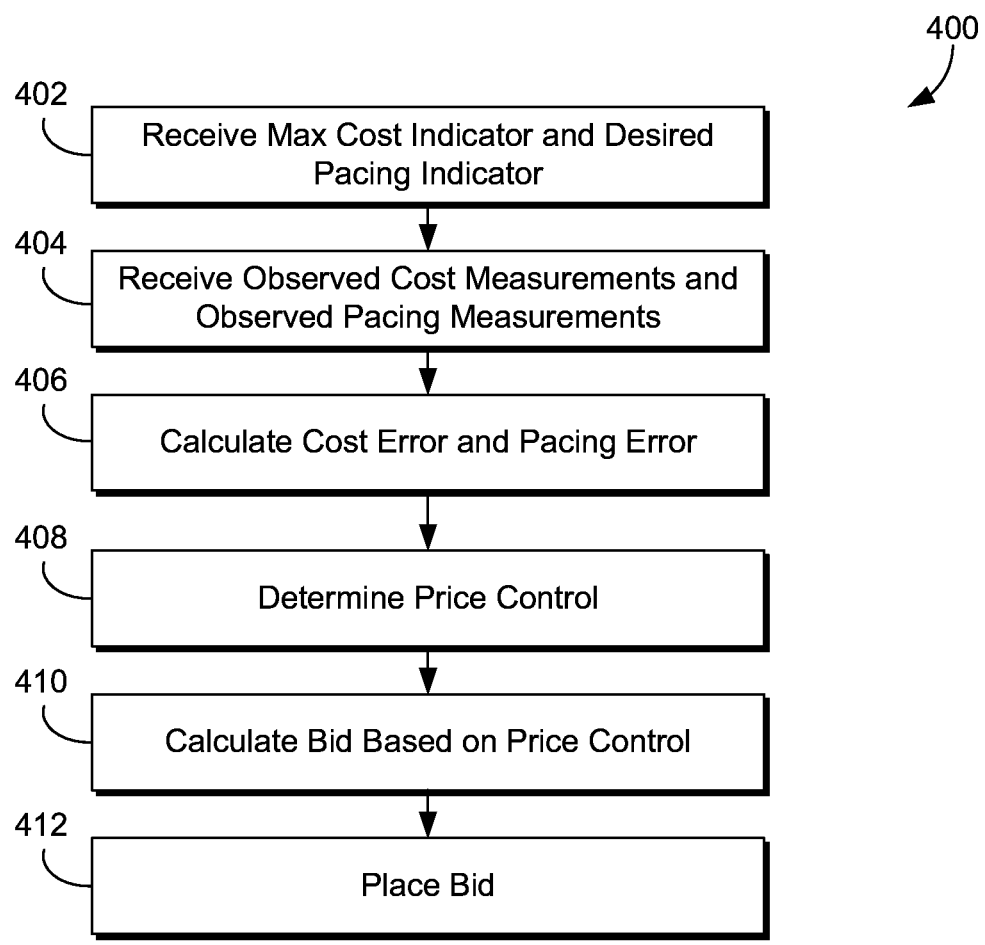
FIG. 4 depicts an illustrative process flow for controlling online advertising campaigns, in accordance with various embodiments of the present disclosure.

FIG. 4 depicts an illustrative process flow 400 for controlling online advertising campaigns, in accordance with various embodiments of the present disclosure. Process flow 400 may begin at block 402 where a max cost indicator and a desired pacing indicator are received. Such indicators may also be referred to herein as signals.

The max cost indicator may be a user (e.g., advertiser) defined maximum cost that the user is willing to pay for an event (e.g., impression, click, or conversion). In some embodiments, the max cost indicator represents the maximum average cost the user is willing to pay for each event, the maximum discrete cost the user is willing to pay for each event, or any other suitable cost restriction.

The desired pacing indicator may also be user defined and may be expressed as monetary units (e.g., dollars) or as a number of events. As used herein, desired pacing refers to a maximum desired revenue or a maximum budget for a portion of the campaign. Revenue may refer to actual money spent or actual events delivered. As such, the desired pacing indicator would be indicative of how much money the user would like to spend on a portion of the campaign or the number of events the user would like delivered during the portion of the campaign.

At block 404 an observed cost measurement and an observed pacing measurement are received. The observed cost measurement can be determined from actual costs for events that are monitored in an advertising marketplace (e.g., advertising marketplace 310). The observed cost measurement may be, for example, a moving average calculated over a period of time. As mentioned previously, this period of time can be any duration of time that may be selected based upon certain campaign characteristics. For example, a shorter period of time can enable quicker reflection of changes in the advertising marketplace, however the results could be noisier than those of a moving average calculated over a longer period of time. A moving average calculated over a longer period of time, on the other hand, can be less noisy than a moving average calculated over a shorter period of time, but is slow to react to market changes. As a result, the time period for such a moving average may be dependent on the campaign and/or volatility of the advertising marketplace.

The observed pacing measurement can be determined by monitoring actual pacing, or revenue, in an advertising marketplace. As with the observed cost measurement, the observed pacing measurement may be a moving average calculated over a period of time. This period of time can be any duration of time that may be selected based upon certain campaign characteristics and subject to the same considerations for the period of time discussed above in reference to the observed cost measurement.

At block 406, the above discussed max cost indicator and observed cost measurement can be utilized to calculate a cost error. In some embodiments, this may be accomplished by taking the difference between the max cost indicator and the observed cost indicator. In addition, the above discussed desired pacing indicator and the observed pacing measurement may be utilized to calculate a pacing error. As with the cost error, in some embodiments, the pacing error is calculated by taking the difference between desired pacing 318 and observed pacing 320.

At block 408 a price control may be determined based on the cost error and the pacing error. In some embodiments, the price control is a result of a function of both the cost error and the pacing error, (e.g., $f(e_c, e_p)$ discussed above in reference to FIG. 3A or $f(r, c, T_{cost}^{max}, B_{rev}^{max})$ discussed above in reference to FIG. 3B). This function may be configured to attempt to achieve the desired pacing at minimum cost within the limits of max cost and/or inventory available in the advertising marketplace. As such, $u_p$, in some embodiments, can be updated in such a way that (1) observed pacing approximately converges to a closest pacing to the desired pacing while observed cost remains at or below max cost, where an increase in observed cost would no longer yield a change in observed pacing without exceeding desired pacing (e.g., the desired pacing is bounding), such a scenario is depicted in scenario 534 of FIG. 5B; or (2) observed cost approximately converges to a closest cost to the max cost while observed pacing remains at or below desired pacing, where an increase in observed cost would no longer yield a change in observed pacing without exceeding max cost (e.g., max cost is bounding), such a scenario is depicted in scenario 540 of FIG. 5B; or (3) observed pacing approximately converges to a maximum possible delivery in the advertising marketplace while observed cost remains at or below max cost, and without $u_p$ staying bounded, where an increase in observed cost can no longer yield a change in observed pacing because the inventory of the marketplace has been exhausted (e.g., inventory in the advertising marketplace is bounding), such a scenario is depicted in scenario 546 of FIG. 5B.

In some embodiments, a bid allocation may also be determined at block 408. Such a bid allocation would represent the percentage or ratio (e.g., point value from 0 to 1) of inventory the ad campaign is willing to purchase at the determined bid price.

In some embodiments, the price control is determined utilizing an adaptive control scheme to calculate the price control. Such an adaptive control scheme could calculate the control signal, and an optional allocation signal, based on a most recent value of the cost error, a most recent value of the pacing error, and a stored controller state variable, which includes information about the past control performance. The adaptive control scheme is known in the art and a person of ordinary skill in the art would be able to implement such a control scheme. In other embodiments, alternative control schemes, may be utilized in place of the above discussed adaptive control scheme. Such control schemes are known in the art and would include an optimal control scheme, a model predictive control scheme, a proportional-integral-derivative (PID) control scheme, a robust control scheme, a stochastic control scheme, or any other suitable control scheme. In some embodiments, the price control may be a separated price control.

At block 410 a bid is calculated based on the price control determined at block 408. In embodiments, a bid may be calculated for each cell of an advertising marketplace that is of interest to the advertising campaign. As used herein, a cell refers to a defined portion of an advertising marketplace. Such a cell may be, for example, a website, a group of individuals identified by demographic analysis (e.g., males between the age of 25 and 35 in California), a discrete individual, etc. In such embodiments, one or more cell-level performance predictions may be utilized in conjunction with the price control to calculate respective bid prices for each cell. The performance prediction of a cell represents the likelihood of that an impression delivered to that cell will result in either a click-through or a conversion. Finally at block 412, the bid is placed with the advertising marketplace.

Figure 5A:
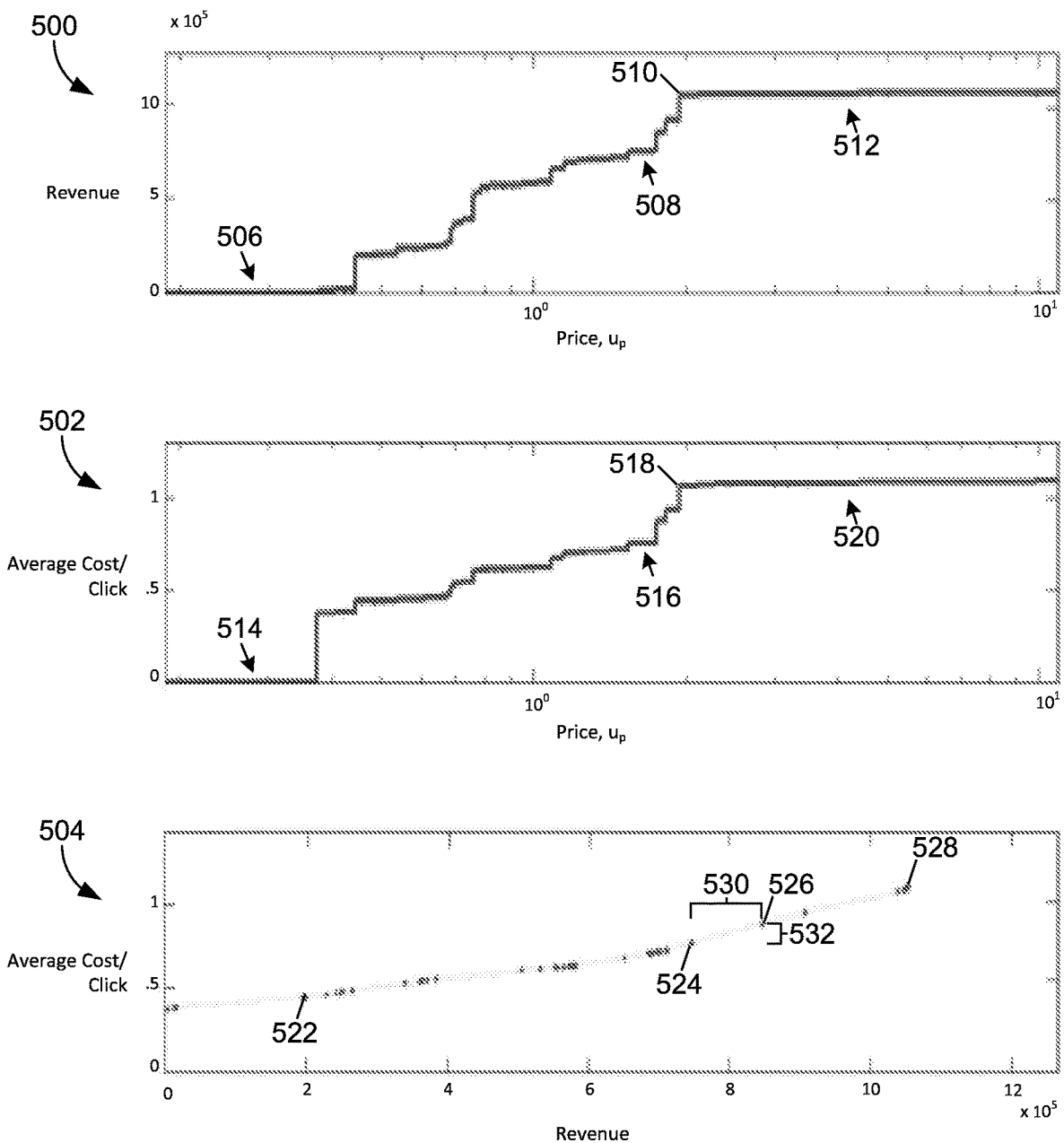
FIG. 5A illustrates graphical depictions of a realistic cost revenue relationship of an online advertising campaign, in accordance with various embodiments of the present disclosure.

FIG. 5A illustrates graphical depictions, 500-504, of a realistic cost revenue relationship. These depictions assume perfect performance estimates where predicted performance, $\hat{p}_i$, is equal to the actual performance, $p_i$, for all i. Graph 500 depicts revenue on the y-axis as price control signal, $u_p$, increases along the x-axis. As can be seen in the depicted scenario of graph 500, as the price control signal increases revenue also increases; however revenue does not increase smoothly. The first portion of the graph, portion 506, demonstrates that there are some price control signal values for which no revenue is achieved. Horizontal portions of the graph depict portions of the graph where an increase in price control signal along that horizontal portion will not yield additional revenue (e.g., horizontal portion 508). Point 510 depicts the value at which an increase in the price control signal (e.g., along portion 512) no longer results in an increase in revenue due to exhaustion of the market (e.g., all available impressions can be purchased at this price point).

Graph 502 depicts average cost/click on the y-axis as price control signal, $u_p$, increases along the x-axis. As can be seen in the depicted scenario of graph 502, as price control signal increases, average cost/click also increases; however, as with revenue, average cost/click does not increase smoothly. The first portion of the graph, portion 514, demonstrates that there are some price control signal values for which there is no average cost/click. This is because the value is so low, no inventory can be purchased. Again, horizontal portions of the graph depict portions of the graph where an increase in the price control signal along that horizontal portion will not yield higher average cost/click (e.g., horizontal portion 516). Point 518 depicts the value at which an increase in price control signal (e.g., along portion 520) no longer results in an increase in average cost/click due to exhaustion of the market (e.g., all available impressions have been purchased at this price point).

Graph 504 depicts the relationship between average cost/click on the y-axis and daily revenue along the x-axis, in accordance with graphs 500 and 502. The possible points in graph 504 consistent with a controller, such as that discussed herein, to achieve a cost minimization are depicted by the dots (e.g., dots 522-528) along the graph. It will be appreciated that the line depicted connecting the dots is only included as a guide between the dots. For some specific value of price, $u_p$, the operating point is at the dot labeled 524. Increasing price, $u_p$, from this specific value does not lead to a different operating point in FIG. 504 until it reaches a threshold value at which the operating point jumps from 524 to 526. The range of $u_p$ values for which 524 is the operating point, and the threshold value where 526 becomes the operating point can be determined from plots 500 and 502.

Figure 5B:
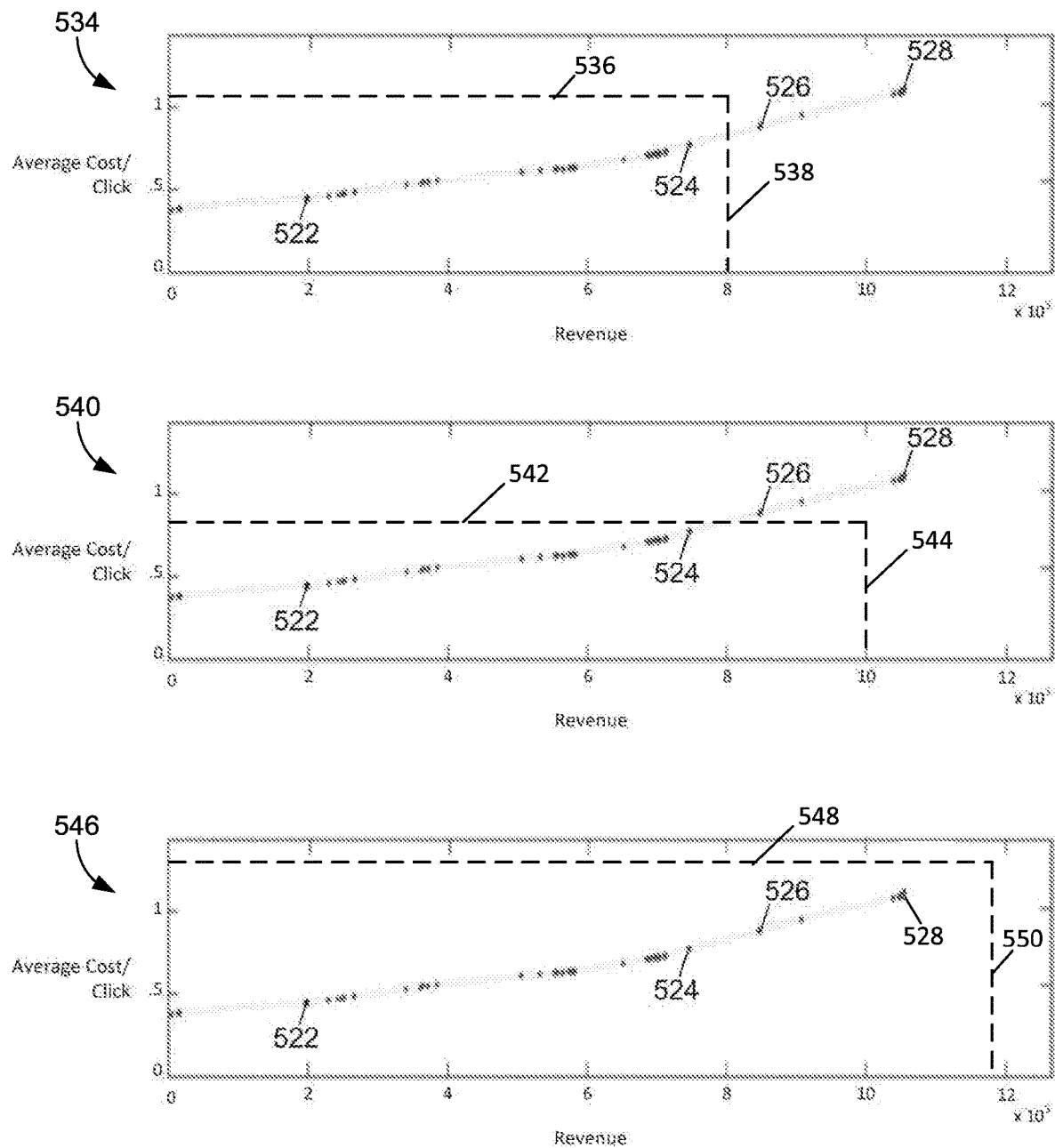
FIG. 5B illustrates graphical depictions of possible campaign scenarios in accordance with the realistic cost revenue relationship of FIG. 5A.

FIG. 5B illustrates graphical depictions of possible campaign scenarios 534, 540, and 546, in accordance with the realistic cost revenue relationship of FIG. 5A. Scenario 534 depicts an advertising campaign in which the max cost is depicted by line 536, hereinafter merely referred to as max cost 536 and desired pacing is depicted by line 538, hereinafter merely referred to as desired pacing 538. In scenario 534 it can be observed that the depicted advertising campaign is bounded by desired pacing 538. As such, $u_p$ in this campaign, would be updated in such a way that observed pacing, or revenue, approximately converges to dot 524. Dot 524 represents the closest pacing to the desired pacing 538 and minimum cost, at which an increase in average cost/click, or observed cost, no longer yields a change in observed pacing without exceeding desired pacing. Put another way, while there is room to move up in average cost/click and remain below max cost to acquire additional revenue, the highest revenue that can be achieved under the depicted conditions of the advertising marketplace and within the bounds of the current advertising campaign is represented by dot 524 and therefore dot 524 would represent the desired point of convergence for scenario 534. It will be appreciated that, due to changes in the advertising marketplace or changes in the advertising campaign, that the depicted graph may change over time and that scenario 534 merely represents a point in time of the depicted advertising campaign.

Scenario 540 depicts an advertising campaign in which the max cost is depicted by line 542, hereinafter merely referred to as max cost 542 and desired pacing is depicted by line 544, hereinafter merely referred to as desired pacing 544. In scenario 540 it can be observed that the depicted advertising campaign is bounded by max cost 542. As such, $u_p$ in this campaign, would be updated in such a way that observed cost, or average cost/click approximately converges to dot 524 again. Dot 524 represents the closest cost to the max cost 542 and closest pacing to the desired pacing 544, at which an increase in average cost/click no longer yields a change in observed pacing, or revenue, without exceeding max cost 542. Put another way, while desired pacing 544 has not been achieved, the highest revenue that can be achieved under the depicted conditions of the advertising marketplace and within the bounds of the current advertising campaign is represented by dot 524 and therefore dot 524 would represent the desired point of convergence for scenario 540. It will be appreciated that, due to changes in the advertising marketplace or changes in the advertising campaign, that the depicted graph may change over time and that scenario 540 merely represents a point in time of the depicted advertising campaign.

Scenario 546 depicts an advertising campaign in which the max cost is depicted by line 548, hereinafter merely referred to as max cost 548 and desired pacing is depicted by line 550, hereinafter merely referred to as desired pacing 550. In scenario 546 it can be observed that the depicted advertising campaign is not bounded by either max cost 548 or desired pacing 550, but rather by the maximum possible delivery, or revenue, in the advertising marketplace, represented by dot 528. As such, $u_p$ in this campaign, would be updated in such a way that observed cost, average cost/click, and observed pacing, revenue, approximately converges to dot 528. Dot 528 represents the maximum possible delivery in the advertising marketplace and minimum cost, at which an increase in observed cost can no longer yield a change in observed pacing because the inventory of the marketplace has been exhausted. Put another way, while desired pacing 550 has not been achieved and there is still room within the bounds of max cost 548, the highest revenue that can be achieved under the depicted conditions of the advertising marketplace is represented by dot 528 and therefore dot 528 would represent the desired point of convergence for scenario 546. Again, it will be appreciated that, due to changes in the advertising marketplace or changes in the advertising campaign, that the depicted graph may change over time and that scenario 540 merely represents a point in time of the depicted advertising campaign.

Having described embodiments of the present invention, an example operating environment in which embodiments of the present invention may be implemented is described below in order to provide a general context for various aspects of the present invention. Referring to FIG. 6, an illustrative operating environment, or computing platform, for implementing embodiments of the present invention is shown and designated generally as computing device 600. Computing device 600 is but one example of a suitable computing environment and is not intended to suggest any limitation as to the scope of use or functionality of the invention. Neither should the computing device 600 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialized computing devices, etc. The invention may also be practiced in distributed computing environments where tasks are performed by remote-processing devices that are linked through a communications network.

With reference to FIG. 6, computing device 600 includes a bus 610 that directly or indirectly couples the following devices: memory 612, one or more processors 614, one or more presentation components 616, input/output (I/O) ports 618, I/O components 620, and an illustrative power supply 622. Bus 610 represents what may be one or more busses (such as an address bus, data bus, or combination thereof). Although depicted in FIG. 6, for the sake of clarity, as delineated boxes that depict groups of devices without overlap between these groups of devices, in reality this delineation is not so clear cut and a device may well fall within multiple ones of these depicted boxes. For example, one may consider a display to be one of the one or more presentation components 616 while also being one of the I/O components 620. As another example, processors have memory integrated therewith in the form of cache; however, there is no overlap between the one or more processors 614 and the memory 612. A person having ordinary skill in the art will readily recognize that such is the nature of the art, and it is reiterated that the diagram of FIG. 6 merely depicts an illustrative computing device that can be used in connection with one or more embodiments of the present invention. It should also be noticed that distinction is not made between such categories as "workstation," "server," "laptop," "hand-held device," etc., as all such devices are contemplated to be within the scope of computing device 600 of FIG. 6 and any other reference to "computing device," unless the context clearly indicates otherwise.

Computing device 600 typically includes a variety of computer-readable media. Computer-readable media can be any available media that can be accessed by computing device 600 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 600. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 612 includes computer-storage media in the form of volatile and/or nonvolatile memory. The memory may be removable, non-removable, or a combination thereof. Typical hardware devices may include, for example, solid-state memory, hard drives, optical-disc drives, etc. Computing device 600 includes one or more processors 614 that read data from various entities such as memory 612 or I/O components 620. Presentation component(s) 616 present data indications to a user or other device. Illustrative presentation components include a display device, speaker, printing component, vibrating component, etc.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in a limiting sense, and the scope of embodiments is defined by the appended claims and their equivalents.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. A method of controlling advertising campaigns comprising:
    receiving, from an advertiser, a cost indicator that indicates an average cost per event to stay below for a current portion of an advertising campaign of the advertiser;
    obtaining, by a processor via a cost sensor, real-time data associated with bid transactions of an advertising market associated with the advertising campaign;
    monitoring, by the processor, one or more bid transactions of the advertising market in the real-time data;
    determining, by the processor, an observed cost measurement from the one or more bid transactions based on the monitoring;
    determining, by the processor, one or more cell-level performance predictions associated with the advertising market, wherein the one or more cell-level performance predictions comprise a first cell-level performance prediction of a first cell of the advertising market representing a likelihood that an impression delivered to the first cell will result in at least one of a click-through or a conversion and a second cell-level performance prediction of a second cell of the advertising market representing a likelihood that an impression delivered to the second cell will result in at least one of a click-through or a conversion;
    determining, by the processor, an adaptive control scheme configured to calculate one or more signals based on a stored controller state variable comprising information about past control performance associated with one or more past bids;
    receiving a pacing indicator that indicates a pacing to achieve for the current portion of the advertising campaign;
    determining, by a campaign controller via the processor, a price control, using the adaptive control scheme, based on a function $f(r, c, T_{cost}^{max}, B_{rev}^{max})$, wherein r represents an observed pacing measurement, c represents the observed cost measurement, $B_{rev}^{max}$ represents the cost indicator, and $B_{rev}^{max}$ represents the pacing indicator;
    updating, by the processor, the price control to generate an updated price control, using the adaptive control scheme, based on a change to the pacing;
    receiving, from the advertiser, a cost reference signal indicative of a cost restriction for the advertising campaign;
    calculating, by the processor, a cost error based on the cost reference signal; and
    controlling, by the campaign controller via the processor, a bid price for the advertising campaign based on the cost error and $\min(\text{maxCPI}, u_p \hat{p}_t)$, wherein maxCPI represents max cost per impression, $u_p$ represents at least one of the price control or the updated price control, and $\hat{p}_i$ represents at least one of the one or more cell-level performance predictions, wherein the controlling is associated with optimizing performance of bidding in the advertising market in favor of the advertiser.

2. The method of claim 1, comprising:
    monitoring the bid transactions of the advertising market; and
    determining the observed pacing measurement from the bid transactions.

3. The method of claim 2, wherein determining the price control based on the observed pacing measurement comprises:
    calculating a pacing error based on a difference between the pacing indicator and the observed pacing measurement; and
    determining the price control based on the pacing error.

4. The method of claim 3, wherein the adaptive control scheme is configured to calculate the one or more signals based on a most recent value of a cost error signal and a most recent value of a pacing error signal.

5. The method of claim 2, wherein the price control is a single price control.

6. The method of claim 2, wherein the pacing indicator is represented in monetary units.

7. The method of claim 2, wherein the pacing indicator is represented as a number of events, wherein the number of events comprise at least one of impressions, clicks, or conversions.

8. The method of claim 2, wherein the observed cost measurement is a moving average.

9. The method of claim 2, wherein the observed pacing measurement is a moving average.

10. One or more non-transitory computer-readable media having instructions stored thereon, wherein the instructions, when executed by a processor of a computing device, cause the computing device to:
    receive, from an advertiser, a cost indicator that indicates an average cost per event to stay below for a current portion of an advertising campaign of the advertiser;
    receive, from the advertiser, a pacing indicator that indicates a pacing to achieve for the current portion of the advertising campaign;
    obtain, by the processor via a cost sensor, real-time data associated with bid transactions of an advertising market associated with the advertising campaign;
    monitor, by the processor, one or more bid transactions of the advertising market in the real-time data;
    determine, by the processor, an observed cost measurement and an observed pacing measurement from the one or more bid transactions based on the monitoring;

determine, by the processor, one or more cell-level performance predictions associated with the advertising market, wherein the one or more cell-level performance predictions comprise a first cell-level performance prediction of a first cell of the advertising market representing a likelihood that an impression delivered to the first cell will result in at least one of a click-through or a conversion and a second cell-level performance prediction of a second cell of the advertising market representing a likelihood that an impression delivered to the second cell will result in at least one of a click-through or a conversion;

determine, by the processor, an adaptive control scheme configured to calculate one or more signals based on a stored controller state variable comprising information about past control performance;

receive, by the processor, a pacing indicator that indicates a pacing to achieve for the current portion of the advertising campaign;

determine, by a campaign controller via the processor, a price control, using the adaptive control scheme, based on a function $f(r, c, T_{cost}^{max}, B_{rev}^{max})$, wherein r represents the observed pacing measurement, c represents, the observed cost measurement, the pacing indicator and the observed pacing measurement, $T_{cost}^{max}$ represents the cost indicator, and $B_{rev}^{max}$ represents the pacing indicator;

update, by the processor, the price control to generate an updated price control, using the adaptive control scheme, based on a change to the pacing; and control, by the campaign controller via the processor, a bid price for the advertising campaign based on min (maxCPI, $u_p\hat{p}_i$), wherein maxCPI represents max cost per impression, $u_p$ represents at least one of the price control or the updated price control and $\hat{p}_i$ represents at least one of the one or more cell-level performance predictions.

11. The one or more computer-readable media of claim 10, wherein to determine the price control based on the cost indicator, the observed cost measurement, the pacing indicator, and the observed pacing measurement, the instructions cause the computing device to:

calculate of a cost error based on a difference between the cost indicator and the observed cost measurement;

calculate a pacing error based on a difference between the pacing indicator and the observed pacing measurement; and determine the price control based on the cost error and the pacing error.

12. The one or more computer-readable media of claim 11, wherein the adaptive control scheme is configured to calculate the one or more signals based on at least one of a most recent value of a cost error signal or a most recent value of a pacing error signal.

13. The one or more computer-readable media of claim 10, wherein the price control is a single price control.

14. The one or more computer-readable media of claim 10, wherein the pacing indicator is represented in monetary units.

15. The one or more computer-readable media of claim 10, wherein the pacing indicator is represented as a number of events, wherein the number of events comprise at least one of impressions, clicks, or conversions.

16. A system for controlling advertising campaigns comprising:

one or more processors configured to implement:

a cost error calculator to:

receive a cost signal that indicates an average cost per event to stay below for a current portion of an advertising campaign and an observed cost signal based on observed transactions of the advertising campaign; and generate a cost error signal based on the cost signal and the observed cost signal;

a pacing error calculator to:

receive a pacing signal that indicates a pacing to achieve for the current portion of the advertising campaign and an observed pacing signal based on one or more observed transactions of the advertising campaign; and generate a pacing error signal based on the pacing signal and the observed pacing signal; and a controller to:

determine one or more cell-level performance predictions associated with an advertising market associated with the advertising campaign, wherein the one or more cell-level performance predictions comprise a first cell-level performance prediction of a first cell of the advertising market representing a likelihood that an impression delivered to the first cell will result in at least one of a click-through or a conversion and a second cell-level performance prediction of a second cell of the advertising market representing a likelihood that an impression delivered to the second cell will result in at least one of a click-through or a conversion;

generate, via a campaign controller, a price control signal based on a function $f(r, c, T_{cost}^{max}, B_{rev}^{max})$, wherein r represents an observed pacing measurement associated with the observed pacing signal, c represents an observed cost measurement associated with the observed cost signal, $T_{cost}^{max}$ represents a cost indicator associated with the cost signal, and $B_{rev}^{max}$ represents a pacing indicator associated with the pacing signal;

update the price control signal to generate an updated price control signal based on a change to the pacing; and control, via the campaign controller, a bid price for the advertising campaign based on maxCPI, $u_p$, and $\hat{p}_i$, wherein maxCPI represents max cost per impression, $u_p$ represents at least one of the price control signal or the updated price control signal and $\hat{p}_i$ represents at least one of the one or more cell-level performance predictions, wherein the controlling is associated with optimizing performance of bidding in the advertising market in favor of an advertiser.

17. The system of claim 16, wherein to generate the price control signal based on the cost error signal and the pacing error signal is accomplished utilizing an adaptive control scheme.

18. The system of claim 16, comprising a cost actuator to: calculate a bid in accordance with the price control signal.

19. The system of claim 18, wherein the cost actuator is to receive one or more performance predictions for inventory cells of the advertising campaign and wherein to calculate a bid in accordance with the price control signal is to calculate a bid for each of the inventory cells in accordance with both the one or more performance predictions of the inventory cells and the price control signal.

20. The system of claim 18, wherein the cost actuator is to place the bid in an advertising marketplace associated with the advertising campaign.

* * * * *